Dec. 14, 1943.  R. KRANTZ  2,336,940
DRESS SHIELD
Filed March 4, 1942
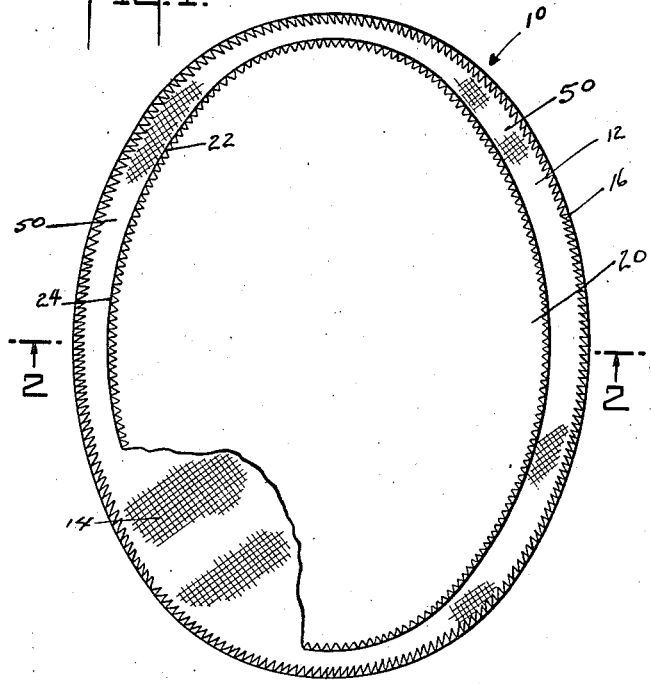
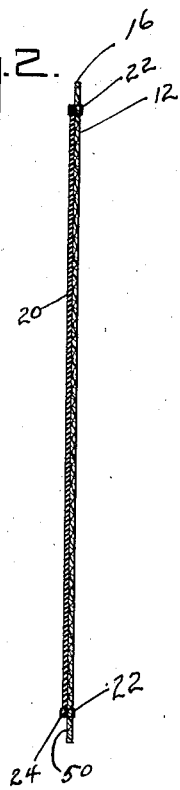
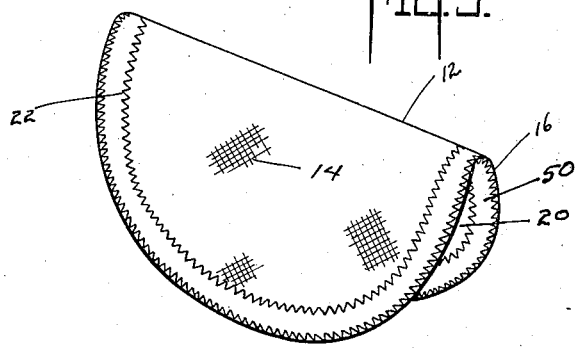
INVENTOR
ROSE KRANTZ
BY
Schaines and Lieberman
ATTORNEYS Patented Dec. 14, 1943

2,336,940

UNITED STATES PATENT OFFICE 2,336,940

DRESS SHIELD

Rose Krantz, Brooklyn, N. Y.

Application March 4, 1942, Serial No. 433,249

1 Claim. (Cl. 2—53)

My invention relates generally to dress shields, and in particular to dress shields combining moisture resisting and moisture absorbing materials.

Shields of this type have long been well known in the art and the components have uniformly been of the same size and shape, or have had a bulky, heavy binding about the margins thereof.

The main object of my invention is to provide a dress shield in which the moisture resisting material and the moisture absorbing material are of the same shape but of different size.

Another object of my invention is the provision of a dress shield of the character described in which the absorbent material is bias-cut.

Another object of my invention is the provision of a dress shield of the character described in which the absorbent material is larger than the resisting material, and a portion of the absorbent material projects out from the resisting material all around same.

Further objects of my invention will be obvious and still others pointed out hereinbelow in connection with the following description of an illustrative embodiment.

In the drawing annexed hereto:

Figure 1 is a top plan view of one form of device constructed according to and embodying my invention;

Fig. 2 is a section on the line 2—2 of Fig. 1; and

Fig. 3 is a perspective of the device in position for application to a dress or similar garment.

The device of my invention, indicated generally by reference numeral 10, comprises a generally elliptical portion 12 of flannel, or any other suitable material, which combines lightness with the ability to absorb body moisture. This positive portion 12 is preferably bias-cut, as indicated at 14, and the edge 16 thereof is stitched to prevent unravelling. The bias-cut nature of the positive portion 12 is essential in my device because the shield will more easily conform to the outlines of its place of insertion without permanent distortion, and return to shape quickly and easily upon laundering.

I provide a negative portion 20 of thin moisture resistant material, as pyroxylin or the like, and secure same on top of the positive flannel portion 12. Negative 20 is also generally elliptical in shape, but is smaller than positive 12. The two portions are centered, and secured to each other by stitching 22 around the marginal edge 24 of negative 20 through the body of positive 12.

This difference in size results in a marginal portion 50 of the flannel positive 12 extending out from and beyond the edge of the moisture repellant negative 20. This marginal portion 50 is an extremely important feature in the construction of the device of my invention because it prevents the edges of the moisture repellant negative from curling or twisting; because it takes tension away from the repellant negative material; because it makes it unnecessary to pierce the moisture repellant material when sewing or pinning the shield onto a garment; and because it provides an extra amount of material to absorb any moisture oozing down beyond the margins of the negative 20.

Having described my invention, what I claim and desire to secure by Letters Patent is:

A dress shield comprising a generally elliptical portion of moisture repellant material, a generally elliptical portion of bias-cut moisture absorbent material, the edge thereof being stitched to prevent unravelling, said absorbent portion being larger than the repellant portion, said repellant portion being centered on said absorbent portion and secured thereto by stitching along and about the edge of the repellant portion and through the body of the absorbent portion, the absorbent portion projecting out beyond the edges of the repellant material all around the shield to define a border extending entirely around the shield, whereby it may be secured to a dress without harm to the repellant material.

ROSE KRANTZ.